May 21, 1940.　　　　　H. VERSE　　　　　2,201,873
ELECTRIC VALVE CONVERTING SYSTEM
Filed June 15, 1938　　　2 Sheets-Sheet 1
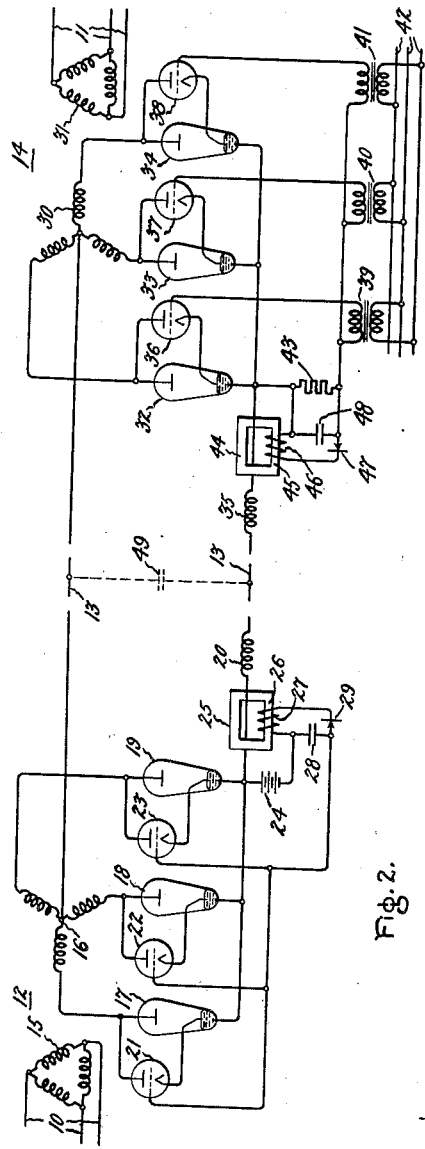
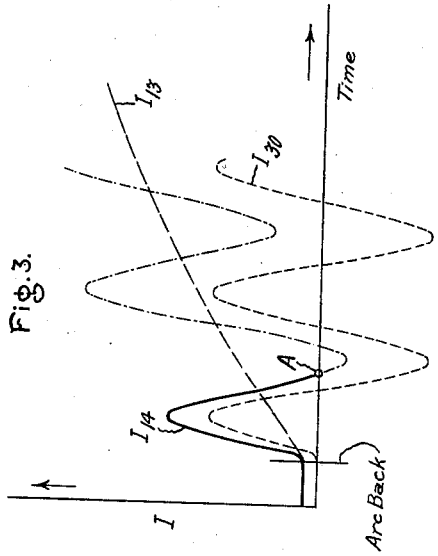
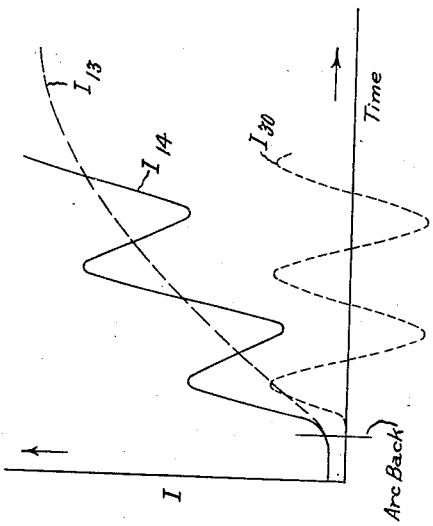
Inventor:
Hansheinrich Verse,
by Harry E. Dunham
His Attorney.

May 21, 1940.                H. VERSE                2,201,873
              ELECTRIC VALVE CONVERTING SYSTEM
                 Filed June 15, 1938        2 Sheets-Sheet 2
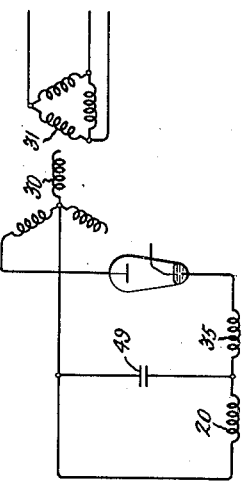
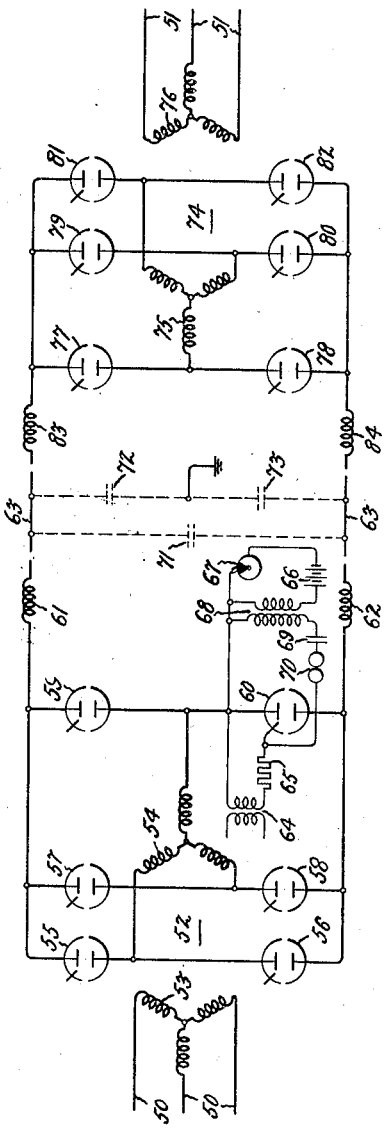
Inventor:
Hansheinrich Verse,
by Harry E. Dunham
His Attorney.

Patented May 21, 1940

2,201,873

UNITED STATES PATENT OFFICE 2,201,873

ELECTRIC VALVE CONVERTING SYSTEM

Hansheinrich Verse, Brunswick, Germany, assignor to General Electric Company, a corporation of New York Application June 15, 1938, Serial No. 213,912
In Germany June 21, 1937

6 Claims. (Cl. 175—363)

My invention relates to electric valve converting systems and more particularly to an arrangement for protecting such systems upon the occurrence of abnormal current conditions.

Heretofore numerous circuit arrangements have been devised for protecting electric valve converting systems upon the occurrence of abnormal current conditions such as arc backs. In the instance of a rectifying converting system supplying energy to a static load and not to a dynamic or live load, it is apparent that control of the valve in which abnormal current conditions are occurring may be obtained by rendering ineffective the control circuit for the valve or in the instance of grid control valves by placing a high negative bias on the grid electrode. In the instance of inverters, however, even when they are supplying energy to a dynamic or live load the alternating potential appearing across the valve in which abnormal current conditions are occurring will not be sufficient to interrupt the direct current supplied by the direct current source. In accordance with my invention I provide means responsive to abnormal current conditions in the electric arc discharge or valve converting system which will produce a reversal of potential across the arc discharge path in which abnormal current conditions are occurring. This is accomplished by causing a resonant voltage condition to appear upon the occurrence of abnormal current conditions which will have a frequency corresponding to the frequency of the alternating current load circuit thereby to assist the potential supplied by this load circuit to reverse the potential appearing across the arc discharge path in which abnormal current conditions are occurring.

It is an object of my invention to provide an improved protective circuit for an electric valve inverting system.

The novel features which I believe to be characteristic of my invention are set forth with particularity in the appended claims. My invention itself, however, both as to its organization and method of operation, together with further objects and advantages thereof, will be better understood by reference to the following description taken in connection with the accompanying drawings in which Fig. 1 represents a transmission system utilizing electric valve converting systems embodying my invention, Figs. 2, 3 and 4 are explanatory of the operation of my invention, and Fig. 5 shows a further application of my invention to another type of transmission system.

Referring more particularly to Fig. 1 of the drawings, there is shown an application of my invention to a transmission system which comprises an alternating current supply circuit 10, and an alternating current load circuit 11 which are interconnected by an electric valve rectifying apparatus 12, a direct current transmission line 13 and an electric valve inverting apparatus 14. The electric valve rectifying means 12 comprises a primary winding 15, and a secondary winding 16, the neutral point of which is connected to one side of the direct current circuit 13 and the outer extremities of which are interconnected by means of valves 17, 18 and 19 through a reactor 20 to the other side of the direct current circuit 13. The various arc discharge paths or valves 17, 18 and 19 may be any of the several types commonly utilized in the art such as grid controlled valves, multi-anode single cathode arc discharge devices, or valves of the type described by Dr. Erwin Marx in his book entitled "Lichtbogenstromrichter," published in Berlin in 1932 and also described in United States Letters Patent No. 2,074,930 granted March 23, 1937, upon the application of Erwin Marx, but for the purposes of this illustration I have chosen to show valves of the igniter type. Each of these valves of the igniter type such as 17, 18 and 19 is provided with an auxiliary valve such as 21, 22, 23, each of which is provided with an anode, a cathode and a control grid. The anodes of each of these devices are connected to the respective anodes of the igniter valves 17, 18 and 19 and the cathodes of each of these devices are connected to the respective igniter electrodes of these main valves. The control electrodes of the auxiliary valves 21 to 23 are normally at a positive potential due to the source of bias potential 24 so that the valves 17, 18 and 19 are normally rendered conductive in sequence in accordance with the potentials applied to the anodes by the various phases of the secondary winding 16. Interposed between the smoothing reactor 20 and the various valves 17, 18 and 19 there is a relay 25 having a magnetic circuit associated with a common cathode conductor so that upon occurrence of abnormal current conditions in this conductor saturation will occur in that portion of the magnetic structure 26 having a reduced cross section with the result that the winding 27 thereon which is connected to a capacitor 28 through a unidirectional conductor 29 will charge the capacitor to a high negative potential. This high negative potential will, therefore, prevent the auxiliary valves 21 to 23 from becoming conductive thereby interrupting the conductivities of the main valves 17 to 19.

The electric valve inverting system comprises a polyphase network 30 and an output network 31 which supplies energy to the alternating current load circuit 11. The neutral point of the polyphase network 30 is connected to one side of the direct current circuit 13, and the other extremities of this network are interconnected through the valves 32, 33 and 34 and the inductor 35 to the other side of the direct current transmission line 13. Each of the valves 32 to 34 is also provided with an auxiliary valve such as 36 to 38 which serve a function similar to that of the auxiliary valves in the rectifying system. The control circuit for the auxiliary valves 36, 37 and 38 includes a plurality of transformers 39, 40 and 41 which supply alternating potential to the control electrodes and which transformers are energized from a suitable source of alternating current 42. One terminal of each of the secondary windings of the transformers 39 to 41 is connected through a suitable resistor 43 to the cathodes of the main valves 32 to 34. The control circuit also includes a relay 44 which is responsive to abnormal current conditions in the electric valve converting system and which has a reduced magnetic core structure 45 upon which is mounted the winding 46 which supplies current through the unilaterally conductive device 47 to a capacitor 48. This charges the capacitor to a high negative potential so as to maintain the auxiliary valves non-conductive. The negative bias presented by the capacitor 48 after a predetermined time will be dissipated by the resistor 43 so that the electric valve converting system may again resume operation. In accordance with my invention the inductive reactance of the reactor 35 is so chosen with respect to the inductive reactance of the transmission line 13 and the capacitive reactance thereof indicated by the capacitor 49 shown in dotted lines so as to be voltage resonant at a frequency corresponding to the frequency of the alternating current circuit 11 whenever abnormal current conditions occur in any of the valves 32 to 34.

If for simplicity of explanation of the operation of the invention it is assumed that the upper conductor 13 in the drawings is a ground return, an abnormal current condition of one of the valves of the inverter 14 will produce a direct current short circuit through the phase network 30 and the inductors 20 and 35. This short circuit current will increase rapidly as is shown in Fig. 2 by the curve $I_{13}$. At the same time the alternating current network 30 supplies an alternating current which is represented by the curve $I_{30}$ which flows through the rectifying apparatus 12 and the capacitance 49 of the direct current transmission line 13. Thus the current transmitted by one of the tubes 32 to 34 which is presenting the abnormal current carrying conditions transmits a current corresponding to the curve $I_{14}$. If the direct current transmission line 13 is relatively long the impedance which it presents to the inverter 14 is primarily capacitive. By simple calculation it will be apparent that the inductor 35 may be so selected that the maximum alternating current amplitude may be obtained whenever voltage resonance occurs due to arc backs of any of the valves of the inverter 14. The effect of such voltage resonance is to be seen from Fig. 3 in which the curve $I_{13}$ again represents the rate of increase of the direct current flowing through the abnormally conductive arc discharge path, the current $I_{30}$ is the alternating current supplied by the voltage of the network 30 and the current $I_{14}$ is the actual voltage appearing across the terminals of the valves in which the arc back conditions occurred. It will be seen that the curve $I_{14}$ intersects the zero line at the point A with the result that the anode of the valve is driven sufficiently negative as to cause the arc discharge within the valve to be interrupted.

If it is assumed that the smoothing reactors 20 and 35 are of equal size and that each has an inductance value of L and that the capacitor 49 of the direct current transmission line 13 is represented by C it is possible to establish the following equation:

$$\omega L = \frac{2}{C\omega}$$

From this relation it is apparent that the proper values may be selected to produce voltage resonance whenever abnormal current conditions occur in any of the valves of the inverter 14. This can be illustrated by a quantitative example so that in Fig. 4 I set forth the equivalent circuit and it is assumed that the inductance of the inverter is lumped in the reactor 35. If each reactor has an inductance of 1H and if the capacity of the direct current transmission line is estimated at about 20 mf. then for a transmission frequency of 50 cycles there will be a resultant external short circuit reactance Z of about 330 ohms comprising 160 ohms capacitive reactance parallel to 314 ohms inductive reactance. Since the reactance of reactor 35 is equal to 314 ohms it will be seen that there is an approximate resonance. If necessary additional tuning chokes or additional tuning capacity in parallel with the line capacity may be added so as to obtain the desired voltage resonance for the operating frequency. No difficulty will be experienced from the direct current voltage ripple since in the instance of a three-phase rectifier this would be equal to the third harmonic. It is preferable in order to obtain the desired resonant tuning to select the magnetic characteristics of the choke inductors 20 and 35 so that the magnetic structure thereof has a certain direct current magnetic bias. If it is necessary to utilize smoothing reactors somewhat greater than would be desirable for this form of voltage resonance then the reactors may be designed so that at normal operating current they have the required smoothing inductive value and that the inductance decreases with increasing direct current or alternating current values so that the reduced inductance value is obtained at the time that abnormal current conditions or arc backs occur in the rectifier.

The application of my invention to another three-phase rectifying and inverting system is shown in Fig. 5 wherein power is transmitted between the alternating current supply circuit 50 and the alternating current load circuit 51. The rectifying system 52 includes a primary winding 53 energized from the alternating current circuit 50 and a secondary winding 54 which may be arranged in star relation and the outer extremities of this winding are each interconnected with the direct current circuit through a pair of valves such as 55, 56; 57, 58; 59, 60. Inductors such as 61 and 62 are interposed between these valves and the direct current transmission line 63. The valves 55 to 60 may be any of the valves commonly utilized in the art, but for the purpose of illustration they have been shown as comprising that type of arc discharge device described by Dr. Erwin Marx and to illustrate the control for such valves the valve 60 is shown provided with a control similar to that disclosed by Erwin Marx in United States Letters Patent No. 2,074,930. This control circuit is energized from a suitable source of alternating current by means of a control transformer 64, the secondary winding of which is connected to one of the main electrodes of the valve 60 and through a current limiting resistor 65 to the auxiliary or starting electrode. The control circuit furthermore includes means for providing a high tension spark or voltage similar to that obtained in ignition systems for automotive engines. This includes a source of direct current such as a battery 66, a circuit interrupter 67 and the primary winding of a spark coil 68. The secondary winding of the spark coil 68 is connected on one side to the main electrode of the valve 60 and on the other side through a capacitor 69 and a spark gap 70 to the auxiliary or ignition electrode of the valve. The alternating current supplied by the control transformer 64 is insufficient of itself to initiate the arc in the valve but this arc may be started whenever this alternating potential is of a proper polarity by superimposing thereon the ignition voltage obtained from the high tension voltage circuit.

The direct current transmission line 63 being of the two-wire type has a capacitance 71 existing between the two wires and capacitances 72 and 73 existing between the respective wires and the ground. An inverter 74 includes a polyphase network 75 and a polyphase output winding 76 which is connected to the alternating current load circuit 51. The outer extremities of the polyphase network 75 are each provided with a pair of valves such as 77, 78; 79, 80; 81, 82. These valves are connected through smoothing reactors 83 and 84 to the direct current transmission line 63.

If the inverter is operating in conjunction with a direct current transmission line it is possible to permit switching in and out feeder lines by providing tap choke inductors or by providing additional reactors or capacitors to maintain the tunings and which may be constructed in accordance with the principles of the Petersen coil.

The arc back suppression action of the voltage resonant tuning may be further augmented by utilizing the effect of the inductive reactance of the rectifier itself to tend to prevent the rapid increase of the direct current component upon occurrence of abnormal current conditions. My invention also permits the switching in and out of the inverter without a circuit breaker by merely controlling the ignition control circuit. It will also be apparent to those skilled in the art that any type of valve such as the grid controlled valve, the igniter valve, or Marx type valve may be utilized.

While I have shown and described my invention in connection with certain specific embodiments it will, of course, be understood that I do not wish to be limited thereto, since it is apparent that the principles herein disclosed are susceptible of numerous other applications, and modifications may be made in the circuit arrangement and in the instrumentalities employed without departing from the spirit and scope of my invention as set forth in the appended claims.

What I claim as new and desire to secure by Letters Patent of the United States is:

1. In combination, a direct current transmission line, an alternating current load circuit, and an electric valve converting system interconnecting said line and said circuit, said system including a smoothing reactor having a reactance so proportioned relative to the reactance of said line as to become resonant at the frequency of said alternating current load circuit upon occurrence of abnormal current conditions in said converting system.

2. In combination, a direct current transmission line having inductive and capacitive reactances, an alternating current load circuit, and an electric valve converting system interconnecting said line and said circuit, said system including a plurality of arc discharge paths, and means responsive to abnormal current conditions in any of said arc discharge paths for producing a voltage resonant condition at the frequency of said load circuit in a circuit including said last mentioned means and said transmission line reactance thereby to produce a reversal of potential across the arc discharge path in which abnormal current conditions are occurring.

3. In combination, a direct current transmission line, an alternating current load circuit, and an electric valve converting system interconnecting said line and said circuit, said system including a plurality of valves, a control circuit therefor, and a smoothing reactor interposed between said valves and said direct current transmission line, said reactor having a reactance so proportioned relative to the reactance of said transmission line as to become resonant at the frequency of said alternating current load circuit upon occurrence of abnormal current conditions in said converting system, and means responsive to said abnormal current conditions for rendering ineffective said control circuit.

4. In combination, a direct current transmission line, an alternating current load circuit, an electric valve converting system interconnecting said line and said load circuit, said system including a plurality of arc discharge paths, a control circuit therefor, means responsive to abnormal current conditions of said converting system for rendering ineffective said control circuit, and a second means including a circuit resonant at the frequency of said alternating current load circuit responsive to said abnormal current conditions for producing a reversal of potential across the arc discharge path in which abnormal current conditions are occurring.

5. In combination, a direct current transmission line having inductive and capacitive reactances, an alternating current load circuit, an electric valve converting system interconnecting said line and said circuit, an inductive reactance device interposed between said line and said system having such reactance relative to the reactance of said line as to become resonant at the frequency of said alternating current load-circuit upon occurrence of abnormal current conditions in said converting system thereby to produce a reversal of potential across the arc discharge paths of said converting system.

6. In combination, a direct current transmission line having inductive and capacitive reactances, an alternating current load circuit, an electric arc discharge converting system interconnecting said line and said circuit, a control circuit for said system, means responsive to abnormal current conditions of said system to render said control circuit ineffective and inductive reactance means interposed between said system and said transmission line, said inductive reactance means having such reactance relative to said transmission line reactances that upon occurrence of abnormal current conditions in said system a voltage resonant condition corresponding in frequency to the frequency of said alternating current load circuit is produced thereby to cause a reversal of the potential across the arc discharge path in which abnormal current conditions are occurring.

HANSHEINRICH VERSE.